US009305462B2

(12) United States Patent
Rubin et al.

(10) Patent No.: US 9,305,462 B2
(45) Date of Patent: *Apr. 5, 2016

(54) V2V SAFETY SYSTEM USING SELF-GENERATED LANE MAPS

(71) Applicants: Kim Rubin, Menlo Park, CA (US); Joe Betts-Lacroix, Belmont, CA (US)

(72) Inventors: Kim Rubin, Menlo Park, CA (US); Joe Betts-Lacroix, Belmont, CA (US)

(73) Assignee: Zetta Research and Development LLC-ForC Series, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/395,770

(22) PCT Filed: Apr. 23, 2013

(86) PCT No.: PCT/US2013/037853
§ 371 (c)(1),
(2) Date: Oct. 20, 2014

(87) PCT Pub. No.: WO2013/163222
PCT Pub. Date: Oct. 31, 2013

(65) Prior Publication Data
US 2015/0077270 A1    Mar. 19, 2015

Related U.S. Application Data

(60) Provisional application No. 61/637,588, filed on Apr. 24, 2012.

(51) Int. Cl.
*G08G 1/16* (2006.01)
*G08G 1/0967* (2006.01)
(Continued)

(52) U.S. Cl.
CPC .......... *G08G 1/096791* (2013.01); *G01C 21/26* (2013.01); *G01C 21/3658* (2013.01); *G08G 1/09* (2013.01); *G08G 1/0969* (2013.01); *G08G 1/142* (2013.01); *G08G 1/16* (2013.01); *G08G 1/161* (2013.01); *G08G 1/163* (2013.01); *G08G 1/166* (2013.01); *G08G 1/167* (2013.01); *G08G 9/02* (2013.01); *H04J 3/1694* (2013.01); *H04L 5/0091* (2013.01); *H04W 4/046* (2013.01); *H04W 4/06* (2013.01); *H04W 72/005* (2013.01);
(Continued)

(58) Field of Classification Search
None
See application file for complete search history.

(56) References Cited

U.S. PATENT DOCUMENTS

| | | | |
|---|---|---|---|
| 7,236,878 B2 * | 6/2007 | Watanabe | G01C 21/26 340/988 |
| 7,979,198 B1 * | 7/2011 | Kim | G08G 1/091 701/117 |

(Continued)

*Primary Examiner* — Travis Hunnings
(74) *Attorney, Agent, or Firm* — Kim T. Rubin, Patent Agent

(57) ABSTRACT

A vehicle-to-vehicle (V2V) communication transponder for use in V2V communication, safety and anti-collision systems incorporating a location point store and a lane records store, wherein the lane records are constructed by the transponder from the point in the location point store, location points are received from other moving transponders, and lane records are shared between transponder response to a request. Separate source counts are kept for internally generated and shared lane records. Methods of sharing are described. Lane types are also derived from the location point store and other vehicle behavior. No central authority, road-side equipment, (RSU), or pre-determined lane maps are required. Embodiments include a hybrid protocol using both TDMA and CSMA. Some embodiments are free of MAC and IP addresses. Embodiments include equipped vehicles and V2V system using the transponder.

15 Claims, 7 Drawing Sheets

(51) Int. Cl.
*G08G 9/02* (2006.01)
*G08G 1/09* (2006.01)
*G08G 1/14* (2006.01)
*H04W 4/04* (2009.01)
*H04W 4/06* (2009.01)
*G01C 21/26* (2006.01)
*G01C 21/36* (2006.01)
*G08G 1/0969* (2006.01)
*H04J 3/16* (2006.01)
*H04L 5/00* (2006.01)
*H04W 72/04* (2009.01)
*H04W 74/08* (2009.01)
*H04W 72/00* (2009.01)
*H04W 64/00* (2009.01)
*H04W 76/00* (2009.01)
*H04W 76/02* (2009.01)
*B60R 25/33* (2013.01)
*G01S 5/00* (2006.01)
*G08G 1/00* (2006.01)
*B60W 10/06* (2006.01)
*B60W 10/18* (2012.01)
*B60W 10/20* (2006.01)
*B60W 50/14* (2012.01)

(52) U.S. Cl.
CPC ...... *H04W 72/0446* (2013.01); *H04W 74/0816* (2013.01); *B60R 25/33* (2013.01); *B60R 2325/205* (2013.01); *B60W 10/06* (2013.01); *B60W 10/18* (2013.01); *B60W 10/20* (2013.01); *B60W 50/14* (2013.01); *B60W 2550/402* (2013.01); *G01S 5/0027* (2013.01); *G08G 1/20* (2013.01); *H04W 64/006* (2013.01); *H04W 76/002* (2013.01); *H04W 76/023* (2013.01)

(56) References Cited

U.S. PATENT DOCUMENTS 8,884,782 B2 * 11/2014 Rubin ............... G08G 9/02
340/435
2010/0052945 A1 * 3/2010 Breed ............... B60N 2/2863
340/903

* cited by examiner

Fig. 7

| A | B | C | D | E | F | G | H | I |
|---|---|---|---|---|---|---|---|---|
| Row No | Transaction | Generated Internally | Received as Original | Received as Shared | Total Internal Count | Total Internal + Original | Total Shared | Confidence Level |
| 1 | Start | 0 | 0 | 0 | 0 | 0 | 0 | 0 |
| 2 | Recorded first 20 vehicles itself | 20 | | | 20 | 20 | 20 | 2 |
| 3 | Received a count of 10, original | | 10 | | 20 | 30 | 30 | 2 |
| 4 | Recorded another 20, itself | 20 | | | 40 | 50 | 50 | 2 |
| 5 | Received 150 as shared | | | 150 | 40 | 50 | 150 | 3 |
| 6 | Received 60 as shared | | | 60 | 40 | 50 | 150 | 3 |
| 7 | Received 190 as shared | | | 190 | 40 | 50 | 190 | 3 |
| 8 | Recorded another 15, itself | 15 | | | 55 | 65 | 190 | 3 |
| 9 | Received 70, original | | 70 | | 55 | 135 | 190 | 3 |
| 10 | Received 100, original | | 100 | | 55 | 235 | 235 | 3 |
| 11 | Received 235 as shared | | | 235 | 55 | 235 | 235 | 3 |
| 12 | Received as original | | 100 | | 55 | 335 | 335 | 3 |
| 13 | Received as shared | | | 650 | 55 | 335 | 650 | 4 |
| 14 | New lane detected | 0 | 10 | 0 | 0 | 10 | 0 | 1 |

V2V SAFETY SYSTEM USING SELF-GENERATED LANE MAPS

TECHNICAL FIELD

The technical field of this invention is vehicle-to-vehicle (V2V) communication, safety, and anti-collision systems.

BACKGROUND ART

Background art includes wireless communications protocols, including IEEE 802.11, using CSMA and wireless systems using TDMA, such as the Automatic Identification System (AIS). Some systems require a central authority, hierarchical architecture or road-side equipment (RSU). Some systems are completely self-configuring or "ad hoc." Nearly all prior art intended for V2V use includes permanent vehicle identification, and nearly all use IP address and MAC addresses. Background art suffers from: (i) insufficient lane information; (ii) insufficient lane accuracy; (iii) insufficient bandwidth to handle the necessary number of vehicle in a V2V system, (iv) incomplete specifications such that enablement does not exist, (v) non-real time operation which fundamentally fails to provide the purpose of a V2V anti-collision system, which is to prevent collisions, (vi) a chicken-and-egg problem where no entity wishes to make the massive investment required in highly accurate lane maps until there is demand for such lane maps, while anti-collision systems that require the lane maps will not be purchase until the lane maps exist, (vii) no prior art describes how lane maps are to be kept sufficiently updated.

Background patents and patent applications include:
US 2012/0028862, published Feb. 2, 2012, by Nagai, Makoto, et al.;
U.S. Pat. No. 7,979,198-B1, published Jul. 12, 2011, by Kim et al.;
U.S. Pat. No. 7,236,878-B2, published Mar. 24, 2005, by Watanabe, Hisauyuki;
U.S. Pat. No. 5,506,587-A, published Feb. 21, 1993, by LANS, HÅKAN;
U.S. Pat. No. 35,660,404, published Feb. 23, 1971, by Sorkin;
U.S. Pat. No. 6,765,495-B1, published Jul. 20, 2004, by Dunning, et al.;
US 2005/0886318A1, published Apr. 28, 2005, by Liu, Jie;
US 2012/0268295A1, published Oct. 25, 2012, by Yuse, Yoshio;
U.S. Pat. No. 7,840,331, published May 8, 2008, by Yoshioka, Mototaka;
US 2012/0120883, published May 17, 2012, by Chen, Chung-Min, et al.;
US 2008/0095163-A1, published Apr. 24, 2008, by Wai Chen, et al.
Non-patent background literature includes:
FELIX SCHMIDT-EISENLOHR; Interference in Vehicle-to-Vehicle Communication Networks; Feb. 9, 2010; KIT Scientific Publishing; Karlsruhe, Germany; FIGS. 6.3 & 6.6;
KARAGIANNIS, GEORGIOS; Vehicular Networking: A Survey and Tutorial, Feb. 11, 2010; IEEE Communications Surveys;
ON THE ABILITY OF IEEE 802.11P AND STDMA TO PROVIDE PREDICTABLE CHANNEL ACCESS; Bilstrup, Katrin, et al. 2009; Centre for Research on Embedded Systems, Lamstad University, Sweden;
TECHNICAL CHARACTERISTICS AUTOMATIC IDENTIFICATION SYSTEM MARITIME; Intl Telecom Union; 04-2010; Recommendation ITU-R M.1271-4; Geneva.

Priority is claimed to:
U.S. application Ser. No. 13/557,711, filed 25 Jul. 2012, with priority to U.S. Provisional Appl. No. 61/637,588, filed 24 Apr. 2012;
U.S. application Ser. No. 13/559,536, filed 26 Jul. 2012, with priority to U.S. Provisional Appl. No. 61/637,588, filed 24 Apr. 2012; and
U.S. Provisional Appl. No. 61/637,588, filed 24 Apr. 2012.

DISCLOSURE OF THE INVENTION

In various embodiments, this invention is a comprehensive, usable system that will actually function in a real-world V2V environment by overcoming the above-stated weaknesses of the prior art.

Embodiments of this invention create, use and share precise lane maps without the need for any downloaded maps, mapping service, or centralized authority. The V2V transponders create the necessary underlying data to construct lane records entirely from the observed behavior of the host vehicle, and the received broadcasts from other equipped vehicles.

As an equipped vehicle may proxy a number of other vehicles, the observed behaviors include not only equipped vehicles, but also nearby vehicles being proxied by equipped vehicles. The lane records may be created exclusively from such "behavioral" information from real, moving vehicles, without regard for any "maps." However, map and externally provided information may be used supplement the system-created lane data.

Without accurate lane data, it is impossible to know if a vehicle is "staying it its lane" or "straying out of its lane." The difference is between a normally behaving vehicle, and one that suddenly represents a significant risk.

Typically, each equipped vehicle broadcasts it location (and speed and heading) ten times per second. Each such broadcast, whether sent or received by the transponder, provides one "location dot" or "location point" on a virtual map. At 5 m/s, a common speed near an intersection, that is a location dot every 0.5 meters, per vehicle. With input from 5 vehicles, the average spacing is on the order of 100 to 200 cm. The stored location points are "linked," creating the effective lane on which those five vehicles traveled. When enough valid location dots are available, a lane record is created.

A challenge with such a system is knowing the "lane confidence." With a government provided map, no confidence factor is needed: the map is assumed to be 100% correct. This can be a big problem if it appears to a V2V anti-collision system that vehicles are "veering out of their lane," when in fact they are following a detour around construction, for example.

Embodiments provide a novel way of measuring confidence, by counting the number of source vehicles that contributed to a lane record. In addition, the variation in vehicle behavior is considered, in order to determine "acceptable" behavior. In addition, sudden changes in observed behavior cause the confidence in a lane record to be cleared to zero, allowing a new lane record to be created from fresh observations. This system allows actual, real-world changes to roadways to be detected and acted on within seconds.

A crucial embodiment is the sharing of lane records. When a vehicle enters an area for which it does not have lane records, it broadcasts a request for records. One or more nearby vehicles respond with data, which is non-priority data, and so is transmitted in available non-priority bandwidth. A vehicle may have to make multiple requests and receive multiple replies to build up lane records of a new area.

Thus, each vehicle in the V2V systems of embodiments of this invention benefit from not only their own driving history, and the behavior of other equipped vehicles within range, and the behavior of proxied vehicles, but also the stored lane records of all vehicles within range, as needed.

When a transponder's lane record store is fully, those records for lanes not traveled for the longest period of time are deleted, so there is always room for fresh records, as needed.

A challenge with the above system is avoiding having the same underlying data being shared over and over so as to create a "false confidence." To solve this problem separate source counts are kept for "original data"—that is, obtained from real-time transmissions, and "shared data." In one embodiment, counts for original data continue to increase as new original data is collected; while the counts for shared data not incremented, but are rather the maximum of any original data over the history of sharing that lane record, or the value of received shared data counts. Thus, the value of shared data never exceeds the value of some transponder's original data.

To avoid having many vehicles respond to a lane record request, when one vehicle within a range set starts broadcasting lane records in response to the request, other vehicles do not transmit the same or worse information. If their information is better—higher source counts or higher confidence numbers, they may transmit their better data.

To avoid having a vehicle receive lane records it already has, in its request is included the existing source count(s) or confidence level, if any. Transponders only respond to the request if they have better data.

Typically, a transponder responding to lane requests sends lane records sorted so that the lane records nearest the requested location are sent first, followed by records for lanes more distant, and also sorted by the heading direction of the requesting vehicle.

Some embodiments are free of MAC and IP addresses in V2V safety messages. Some embodiments use a hybrid TDMA and CSMA protocol, where the V2V safety messages are transmitted in a priority TDMA class region in the TDMA frame and lane records are shared in CSMA or modified CSMA transmissions in the non-priority CSMA class region in the TDAM frame.

BRIEF DESCRIPTION OF DRAWINGS

FIG. 7 shows an exemplary series of lane record transactions.

BEST MODE FOR CARRYING OUT THE INVENTION

Figure 1:
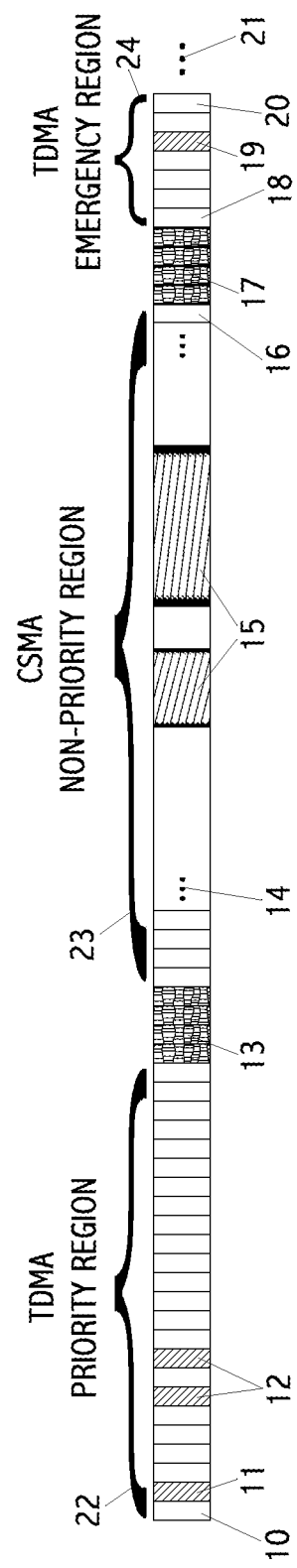
FIG. 1 shows one exemplary frame, time slots, and three class regions in a TDMA V2V protocol.

Lane information is accumulated, computed, and shared entirely within the V2V system, not requiring precision lane maps that currently do not exist.

A unique feature of embodiments of this invention is the ability to create detailed and accurate lane information internally in the overall system, without the need for external data sources. Embodiments use received and transmitted V2V safety messages to first build the point location store, then build lane records from that.

The location point store, or lane history, records location data from received and transmitted V2V broadcasts, include broadcasts for proxy vehicles. It is useful to think of these individual points in the transmissions as dots on a map. As a vehicle traverses the same road day after day, it accumulates a large number of location points. See, for example, FIG. 5. Transponders exchange location point store data as well as map records. "Connecting the dots" forms the basis for lane record. The dots are from real vehicles moving the way drivers actually move in a lane, "real behavior," rather than how engineers or line painters want the lanes to be on a construction blueprint.

The type of lane is generally discernable from this history information. For example, traffic lanes v. parking lanes, and north-bound lanes v. southbound lanes, by examining average speed and direction. Merging lanes and new lanes (when a single lane becomes two lanes) are easily determined by observing the intersection points of distinct lanes. Left and right turn only lanes may be identified by the fact that nearly all vehicle in this lane turn. Because V2V messages include the vehicle type, exceptions for "must turn" for busses and bicyclists are easily determined, too, as are time-based restrictions.

One method of lane identification comprises the following steps. (a) connect adjacent location points; (b) determine lines from connected location points; (c) break up lines into regions 100 meters (for example) long; (d) use the statistics of the location points in that region and of the vehicle reports that provided the location points in that region to assign a lane identification; (e) improve the exact location of key road features (such a merge point, or an intersection, or a stop sign) by examining the data in the region more carefully; (f) assign a confidence level to the derived lane identification based on (i) the number of distinct vehicles that made up the underlying data, and (ii) the number of distinct location points that made up the underlying data; and (iii) the statistics, such as mean deviation and non-compliant location points, of the underlying data. Reasonable thresholds for a "moderate" confidence rating might be a minimum of 10 different vehicles and a minimum of 100 distinct location points with no more than 2% of location points deviating from the determined lane designation.

Location points should only be placed into the location point store only when there is high confidence in the accuracy of the transmitted location for that map dot. There should be a 90% confidence in a location accurate to 50 cm, for example.

Certain types of classifications, such as parking spaces and driveways, use a different standard. For example, a single vehicle turning into or out of a driveway should be sufficient to classify that line as a "private driveway." More vehicles suggest a better designation as a "public driveway." Similarly, a single parked vehicle in the history is sufficient to tentatively identify a parking space or a shoulder.

TABLE I

Lane Data Confidence levels

| Confidence Level | Meaning | Number of Vehicles |
| --- | --- | --- |
| 0 | Not determined | n/a |
| 1 | In flux | n/a |
| 2 | Possible | 20 |
| 3 | Low | 100 |
| 4 | Moderate | 500 |
| 5 | High | 2500 |
| 6 | Very high | 12,500 |
| 7 | Confirmed | n/a |

Table I above shows one embodiment of lane data confidence levels, on a four-bit scale: 0=not determined; 1="in flux"; 2="possible;" 3="low;" 4="moderate;" 5="high;" 6="very high." A value of 0 means "no determination." A value of 7 means "confirmed," such as data from a government source that also matches an actual history confidence of "very high." A value of 1 means "in flux." This value is used when recent data is not consistent with a confidence level or "moderate" or higher.

A key embodiment is the method of increasing confidence level by the continual sharing of lane data. For example, each confidence level from one through 6 requires a minimum of five received instances of "original" data. Suppose a range confidence of two, "possible," requires twenty unique vehicles to have participated in transmitting V2V messages comprising a location in that lane. These message may have been accumulated by a single V2V transponder. That transponder may then assign a confidence level of "possible" and share that original information using a confidence level of two. If that transponder then receives four other, original sets of lane data that are consistent, but distinct, each with a confidence level of "possible," the transponder may increase the confidence level to "low."

A series of location points may be readily transmitted in compressed form by first grouping the location points into speed ranges (0 to 2, 2 to 5, 5 to 10, 10 to 20, 20 to 40, m/s, for example), then ordering the dots in each speed group by location, then using Huffman Coding. Lane designations as part of a lane record determined by a V2V device may be readily transmitted by including two end points, or a set of way-points, the lane designation, and the confidence level. Efficient encoding of digital map data is well known in the art. B-splines may be used. Specific features, such as the location of a stop sign, the corners of an intersection, or a lane merging area may readily be sent by sending the location of the feature and the feature type. See method of identifying geographical locations elsewhere herein.

Lanes should generally start and end at intersection boundaries, or when the lane itself starts or ends. Lanes longer than 1 km should be cut into additional lanes whose length is in the range of 0.1 km to 1 km. For most under- and overpasses, a lane should be defined for each lane on the road(s) that starts and ends at approximately where the slope of the road starts to change from the primary road grade.

The preferred embodiment for lane data representation includes a two-bit field, coded effectively as follows: (00) means there are no known under- or overpasses that intersect with this lane; (01) means there is at least one overpass that intersects with this lane; (10) means there is at least one underpass that intersects with this lane; (11) means there is at least one underpass and at least one overpass that intersects with this lane. By underpass and overpass we mean a non-grade-level crossing that supports a V2V vehicle type (including animals, pedestrians, bicycles, etc.). The preferred embodiment is that lanes be shorted so that there is never more than a single overpass and a single underpass intersecting with the lane. In a few cases, this restriction may be impossible.

A preferred embodiment is a special sub-message for under- and overpasses that describes the type of the under- or over-pass in more detail. If equipped vehicles are aware that they are such a lane segment they should transmit such a sub-message. These sub-messages substantially improve the ability of the V2V system in distinguishing traffic at different grade levels, and may also assist in safety response and navigation information. Such sub-messages should include: type of vehicles permitted; surface type; curvature direction; safety rail information; lighting; special risks (ice, flooding, glare, extreme height, etc.); toll information; and lane width. Bridges qualify for this type of sub-message.

Effective sharing of lane records requires a novel algorithm. One such embodiment is shown by example in FIG. 7. For each lane, three different counts of the unique vehicles whose V2V location points make the lane are kept. These are: (a) Total Internal Count; (b) Total Internal+Original Count; and (c) Total Shared Count. These counts are shown in three respectively labeled columns in the Figure. Lane map data is generated in one of three classes: (a) internal; (b) received as original; (c) received as shared. Transactions representing various combinations of generated or received data are shown in the respectively labeled columns in the Figure. Internally generated map data comprises locations determined by the vehicle itself, including the use of various sensors in addition to the internal V2V system; V2V messages sent, including proxy messages; and V2V location messages received in real-time. Internally generated lane map data comprises individual location points, which are "connected" to create lanes. Received as original lane data comprises data received from other V2V transponders, (which may be communicated by various means other than V2V transmissions), wherein the data was internally generated data from that V2V transponder. Received as shared lane records are marked as "shared."

When a lane record is received by a V2V transponder, the actual lane information is compared with the internal lane information. If the lane information reasonably matches, the lane data is accepted and source counts are increased, as discussed below. If there is no comparable internal lane record, a new lane record is created in memory or an accessible database. If the lane information does not match, counts are generally cleared and the lane confidence is changed to "in flux." A broadcast may be made advertising a "lane status change."

Ideally, but not necessarily, the exact locations that comprise the lane are averaged, using the various sources of lane data. Also, the averaging is based on the respective counts. Thus, in an internal count is 30, and lane data received as original has a count of 100, the weighting of the locations would be 30/130 and 100/130 respectively to determine the new "average" locations, for the end points of the lane, for example. Such averaging is not done if end points or lane data is "locked," due to its source being a calibrated and trusted source, such as government entity or formal, appropriate, lane map provider.

When lane data is shared by a V2V transponder, it is marked by the transponder as one of two of above named classes, either "Original" or "Shared." The "Total Internal Count" is transmitted as "Original." The "Total Shared Count" is transmitted as "Shared."

The three counts, as discussed above, are maintained as follows. Only Generated Internally Counts are accumulated as Total Internal Counts. The Total Internal+Original Count contains the sum of the Total Internal Count plus received Original counts. The Total Shared Counts contains the larger of the prior Total Shared count or the Total Internal+Original Count. Thus, to simplify: Both Internal and Original counts are accumulated, while Shared counts are not accumulated, but are maintained as a "maximum" field.

The reason for this is so that shared counts, moving repeatedly between multiple vehicles are not generally counted more than once. Original counts are assumed to generally comprise actual data from unique vehicles. This is because most vehicles within range are unique, within a moderate time period.

To avoid having original data get counted more than once (at least in a short time period), there are some restrictions. First, original data for a lane should only be transmitted once for that lane, while the transmitting V2V transmitter is within range of that lane. An exception to this rule is that a V2V transmitter may transmit such lane data twice, if it has not changed location between the first and second transmission. (Thus, a vehicle stopped at a light may transmit lane data to vehicles moving on a cross street, more than once.) Second, original data should not be used when received at a common location, such as at home and work. This is because at those locations, nearby vehicles in range will frequently be the same, day after day. Since these locations are well known, there is no reason to accumulate additional lane counts.

Look now at FIG. 7. This algorithm is best understood by the examples shown in the number rows in FIG. 7. These counts are for a single lane. In row 1, we start this new lane with all zero counts. In row two, our vehicle has recorded locations for this lane from 20, presumably unique, vehicles. Note that each vehicle has likely produced a significant number of location points for this lane. For example, a vehicle in a one km long lane, traveling at 40 k/h, will generate approximately 900 location points. If each location "dot" is about 100 cm in diameter, these 18,000 (900*20) location points will effectively merge into a single, nearly contiguous, "lane." Simple curve fitting will provide an excellent "average" lane line.

Thus, in row 2 in FIG. 7, we see a first transaction of recording an Internally Generated count of 20 vehicles, as the lane definition is first created. Note that in the last column the confidence level is set to "2," based on the count. There may be other embodiments that use other methods to provide a confidence level.

Note that the three Count columns each now contain a value of 20. The Total Internal Count holds that total. The Total Internal+Original Count holds the same value, an no Original data has yet been received. The Total Shared holds a value of 20, as it maintains the maximum of the prior two Counts.

In the next transaction row 3, a count of 10 is received from another V2V transponder. The Received as Original count is set to 10. The lane data received is compared against the internally created lane map created in conjunction with the transaction in row 1. They reasonably match, and so they are averaged, using weighting as discussed above. The Total Internal+Original count is increased to 30, and the Total Shared shows the new maximum as 30.

In row 4, we again record another 20 internally generated counts, from presumably 20 more unique vehicles. Perhaps, we have just driven on the same lane the next day. Note that it does not matter if these vehicles are the same as the prior vehicles, because their motion in the lane is unique, as they, too, must be on a different trip. The Total Internal Count increases to 40. The Total Internal+Original count increases to 50, which is also reflected in the revised Total Shared count.

In row 5 in FIG. 7, we now receive a count of 150 marked as "Shared." We set out Shared count to this new maximum of 150. We also average the lane data between what was received and what was stored internally, because we increased the Total Shared count. We again weight the averaging appropriately. The Confidence Level is now raised to "3," because the Total Shared count has reached the necessary threshold for this confidence level.

In row 6 we receive 60 more counts as "Shared." We do not increase the Total Shared and do not perform averaging. The received data may be a copy of data we have already used.

In row 7 we receive 190 as shared. We increase the maximum Total Shared to this 190. We average, but weight the received data only as 40 (=190−150), because much of this data may already have been used in our current average lane locations.

In row 8 we again record 15 real-time vehicles' transmissions. This increased out Total Internal Count to 55 and our Total Internal+Original to 65.

In row 9 we receive a count of 70 as Original. We average this data using the count of 70, because this represents 70 unique vehicle trips. The Total Shared Count does not increase.

In row 10 receive an Original count of 100. This increases the Total Internal+Original count to 235. Since this is larger than 190, the Total Shared count increases to match this.

In row 13 we receive a count 650 as Shared. This increases our Total Shared count to 650, and also now raises the Confidence Level to 4, as that threshold has been reached.

In row 14 we receive as Original a count of 10. However, the lane data received with this count does NOT match our internal lane data. As the V2V transponder would not transmit this lane data unless there was a level of consistency among the 10 vehicles making up this count, clearly something about the lane has changed. Perhaps there is a detour. We reset all of our counts to zero; set our Total Internal+Original Count to 10; and change the Confidence level to "1," or "In Flux."

Note that detours and accidents will have a tendency, using this embodiment, to reset high-count, confident lane information back to zero. This is appropriate, as we wish to have the most current information in our lane maps. When the detour or accident is cleared, it will not take long to re-establish the prior lane. This time, too, is appropriate, because some drivers, unfamiliar with the recent reconfiguration, may not follow the new lane boundaries. Thus, it is appropriate to keep the lane data as low confidence for a time.

Note that such changes to lanes DO reset "high confidence" lane information that comes from an institutional source, as such lane data is likely far more current, perhaps within minutes or seconds, of the lane change.

Low confidence or "in flux" lanes increase computed risk values by increasing the risk in the "weather and road conditions" sub-risk.

When we transmit, that is, "share," lane data, we transmit our lane coordinates and the Total Shared count. If we have recently accumulated data points Generated Internally, we also merge those points into a valid lane (if possible), and send that valid lane data tagged as "Original."

In generally, we keep our lane data from internally generated location points separate from lane data that has been received as shared. This is necessary to avoid having the V2V system constantly re-average old, previously used data. However, the buffers for the internally generated lane data do not typically need to be very large. A few days worth, for example, provides a highly effective V2V map generation capability. Note that shared lane data is kept continuously, until overwritten or deleted due to a lane reconfiguration.

A V2V transponder may send out regular, unsolicited lane records, once per lane. These messages are low priority messages.

A V2V transponder may send out lane data in response to a request for such data. The response to such a request is a low-priority message. In response to a request, a power and encoding should be chosen to reasonably assure that the requestor receives the requested data.

Note that for unsolicited lane data transmissions, a higher density encoding may be used; the general goal is for as many receivers to receive valid data as possible, not that the messages are widely received as valid. Using shorter messages, with the overall system sending more, may be preferable to sending longer, fewer messages, even if fewer recipients of the shorter messages are able to receive them due to the higher density encoding.

In one embodiment a transponder desiring a lane map or a more confident lane map may request from other transponders their confidence level for one or more lanes. Then, the requesting transponder may direct a request to the transponder that responds with the most confident lane map, or, in the case of a tie, the lane map from the closest transponder, or a transponder that will be closest in the future.

As shown above in Table I, a 3-bit confidence level may be used to compactly describe the confidence in a current lane map or lane record. The number of vehicles shown in the third column in the Table is one suggested embodiment. A lane record is not considered usable until it reaches a confidence level of two or higher. A level of seven indicates that the lane record comes from a government or other reliable, well-calibrated source. A value of zero indicates that no confidence level for the lane has been determined. When a V2V transponder receives conflicting lane information it must place the lane confidence at one, "in flux."

Figure 5:
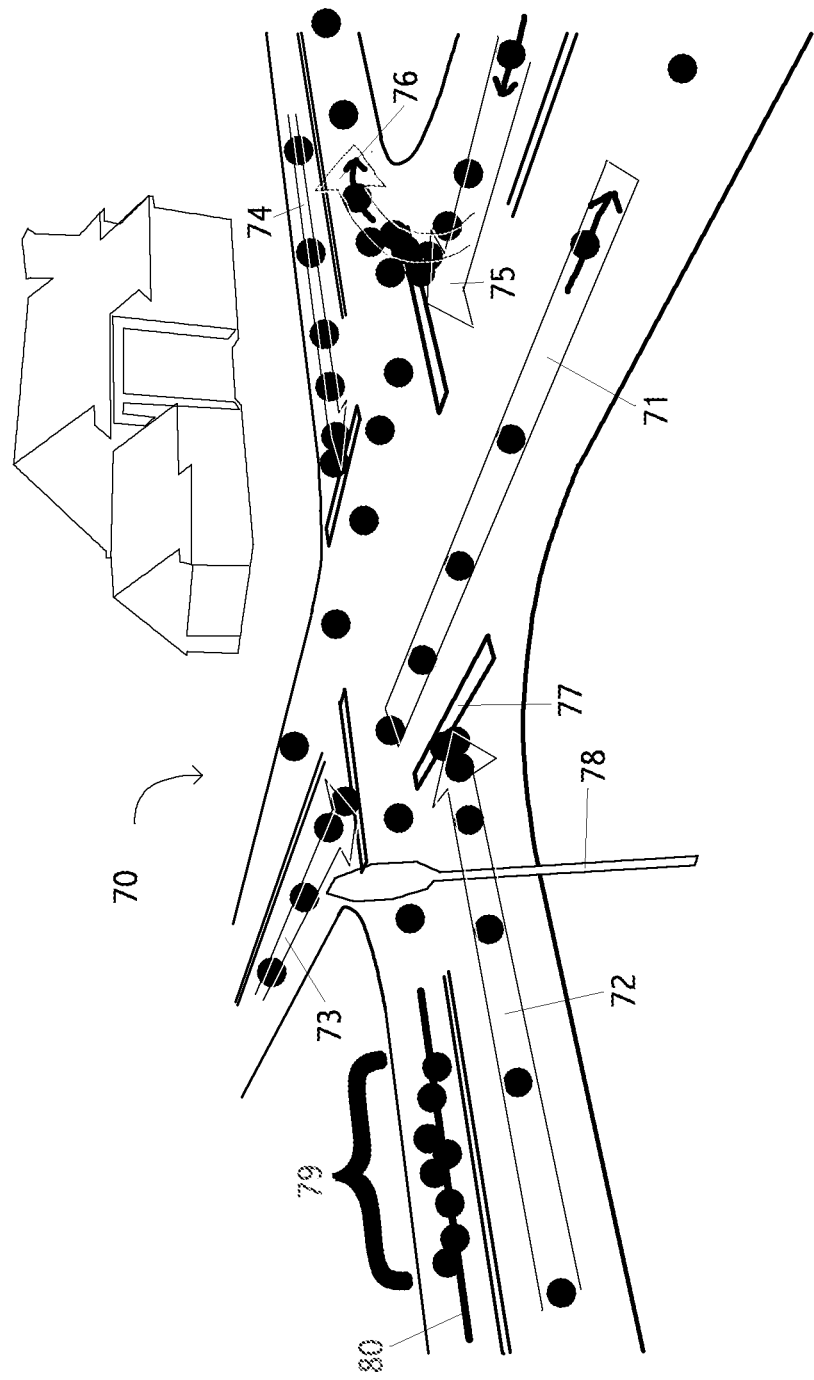
FIG. 5 show exemplary location points, to be used to construct one or more lane records.

FIG. 5 shows how transmitted location points may be built up to create a lane map record. The dotted outlines with the arrows show potential lanes.

V2V transponders constructing lane maps and lane records from vehicle locations in received V2V message should also record the speed and heading of each vehicle. A vehicle at a different heading than most other vehicles may be changing lanes or turning, and thus its transmitted locations, most likely, should not be used to define the lane.

As part of constructing the locations of lanes, maintaining average speed and speed distribution provides significant value. For example, this information allows a V2V transponder to determine if a vehicle is travelling outside of a typical speed in a lane. Such a determination is an important factor in determining vehicle behavior sub-risk. Such information also is assists the V2V system in making lane recommendations. Some portions of some lanes may have a higher average speed, or generally more consistent speeds. For example, on some roads, the left lane may have to stop for vehicles waiting to make an unprotected left turn. On other roads, the right lane may slow frequently for vehicles to make right turns, such as into driveways. A large variation in speeds suggests increased vehicle spacing and increased vigilance. An example V2V recommendation is an audio recommendation to a driver to move into a faster lane; another example is a visual recommendation to a driver to move out of a slower lane. It the driver's goal, at the moment, is to conserve gas, an appropriate recommendation would be to move into the lane with the most consistent speed, on average.

FIG. 1 shows an exemplary frame, time slots and three class regions. This frame is 1000 time slots, starting with time slot 1, shown as reference designator 10, up through time slot 1000, shown as reference designator 20. The TDMA managed priority class region is shown with bracket 22 and comprises time slots 1 through 24. The CSMA managed non-priority class region is shown with bracket 23 and comprises time slots 29 through 989. The TDMA managed emergency class region is shown with bracket 24 and comprises time slots 994 through 1000. Two buffer zones between the CSMA and the TDMA regions are shown as 13 and 17. Each of these buffer zones is shown as four time slots in size. In the priority class region, three time slots are in use, shown as designators 11 and 12. These time slots are numbered 2, 7 and 9. Note that these three time slots are "clumped" near the time slot number 1 end of the priority class region. In the emergency class region, one time slot is in use, number 998, shown with designator 19. Designator 21 shows three dots indicating that the frames repeat continuously. The frame shown may be 0.1 ms in length, with 1000 time slots each 100 µs in length. In the CSMA managed non-priority region, two messages are shown, 15. Note that these messages are variable length and are longer than one time slot. Although there are time slots in the non-priority region, they are less important than in the TDMA managed regions, and are not shown in FIG. 1 except for four time slots at the beginning and one time slot at the end. Designator 14 shows with three dots how these time slots continue throughout the non-priority class region. Designator 16 shows the last time slot, number 989, of the non-priority region. Empty time slots are shown as white. Designator 18 shows time slot number 994, which may be considered the "last" time slot in the emergency class region (with the region "starting" with time slot number 1000, designator 20) as the emergency class region grows downward as demand in the region increases. As demand for the priority region increases, the border between the priority and non-priority regions moves upward, and thus the non-priority region become smaller. As demand for the emergency region increases, the border between the emergency and non-priority regions moves downward, and thus the non-priority region become smaller. The buffer zones are optional.

In FIG. 1, the priority class region is time slot numbers from S1 to S2, where S1 is 1 and S2 is 24. The non-priority class region is S3 to S4, where S3 is 29 and S4 is 989. The emergency class region is S5 to S6, where S5 is 994 and S6 is 1000. This embodiment may have a frame of 100 ms, with 1000, 100 µs time slots. Alternative time slot times are 500, 200 µs time slots, and 250, 400 µs time slots.

In FIG. 1, designator 15 shows two CSMA messages in the non-priority class region. Note that the time gap between the two messages is larger than the time width of one time slot, indicating an embodiment where the inter-message guard time (called the inter-frame time in IEEE 802) is larger in this class region than in the two TDMA regions. Transmit power and desired or effective communication range may be higher, too. Modulation may be different, as well; for example, it may be higher bit rate modulation to encode more data at the cost of lower reliability delivery of the non-critical message.

Figure 2:
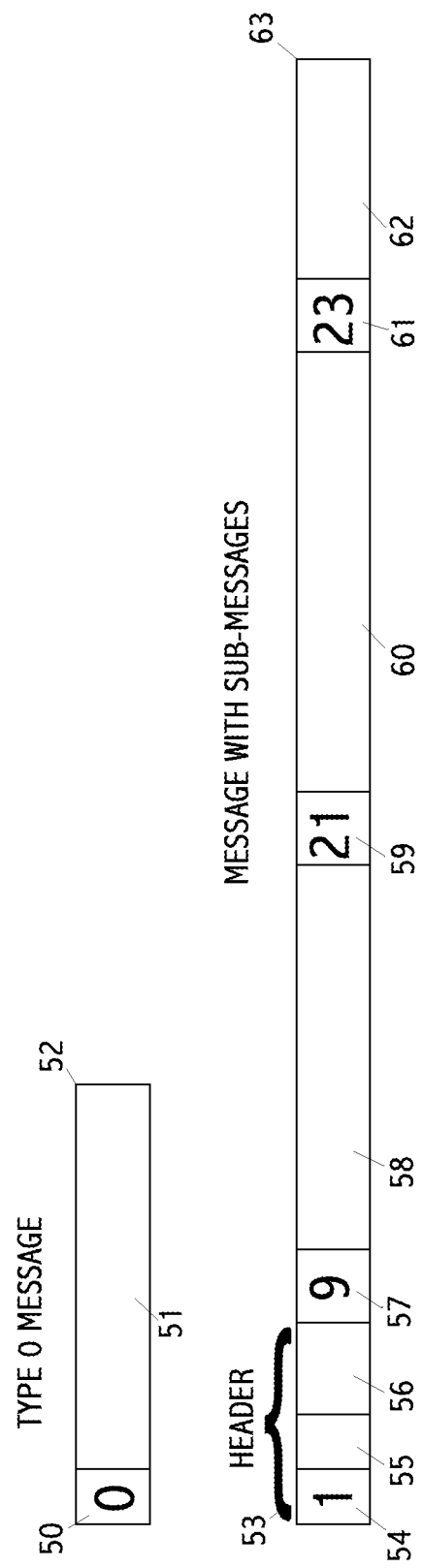
FIG. 2 shows a Type 0 core data message and a message containing sub-messages.

FIG. 2 shows a block diagram of two message types: a Type 0 message and a message with sub-messages. A Type 0 message does not have sub-messages and does not use a header. The first field, designator 50, consists of a zero. The fields, not detailed in this Figure, follow, designator 51. Designator 52 shows the overall Type 0 message. Not shown are any preamble, SIGNAL, FCS, tail bits, and the like. A message with sub-messages, an example of which is shown in this Figure as designator 63, usually contains more data than a Type 0 message. In this Figure, the relative length of the two messages indicates data quantity, not broadcast time. Designator 53 shows the three header fields, indicated by the bracket. This message contains three sub-messages. Designator 54 shows the V2V Revision Level field, here with a value of one. Designator 55 shows the 4-bit Flags field. Designator 56 shows the 8-bit message size field for this entire message, in units of 24-bit symbols. Designator 57 shows the first sub-message type field, here with a value of nine, to indicate a Vehicle Identity Detail sub-message. The data in this sub-message follows, designator 58. Each sub-message size is fixed by its Type. The message length in the header, designator 56, indicates there is more data in the message. The next sub-message begins with a Type field, designator 59, here with a value of 21, indicating a Lane Data Sharing sub-message. The data for this sub-message follows, designator 60. Again, the message length indicates another sub-message, beginning with a Type field, designator 61, here with the value 23, indicating a Parking Detail sub-message. The data for this sub-message follows, designator 62. These three sub-messages together with the Header, are the length of the header length field, so no more sub-messages follow.

Figure 3:
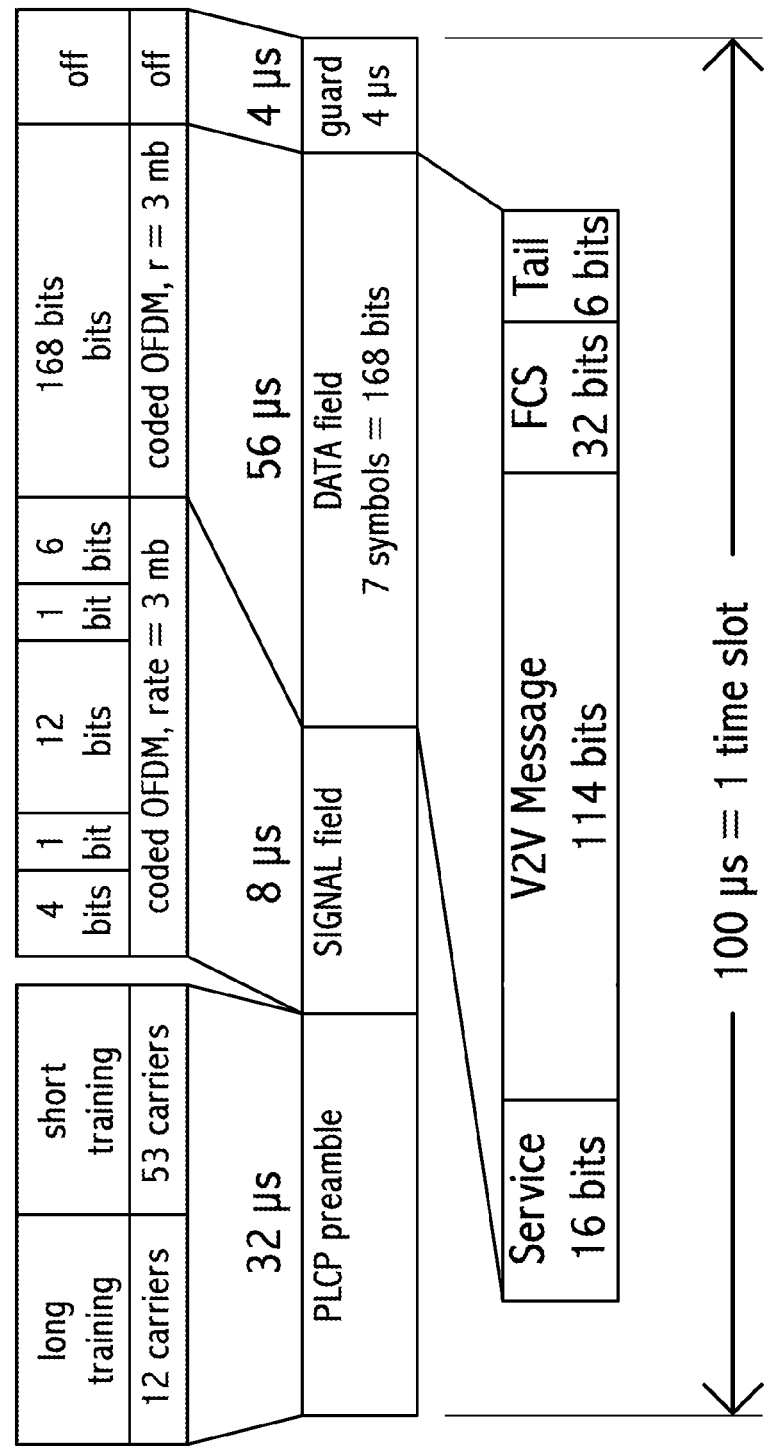
FIG. 3 shows a single 100 μs message frame in IEEE 802.11p format, with a 3 mbit/s modulation, comprising SIGNAL, SERVICE, FCS, and Tail fields, with 114 bits available for a V2V message.

FIG. 3 shows the field lengths and timing for message using 3 mbit/sec (mb/s) modulation for a 100 μs time slot, including a 4 μs guard time. The available time for V2V message data is 7, 24-bit symbols, including the SERVICE, FCS and tail bits, leaving 114 bits net for the message. Timing for other modulations is computed similarly.

Figure 4:
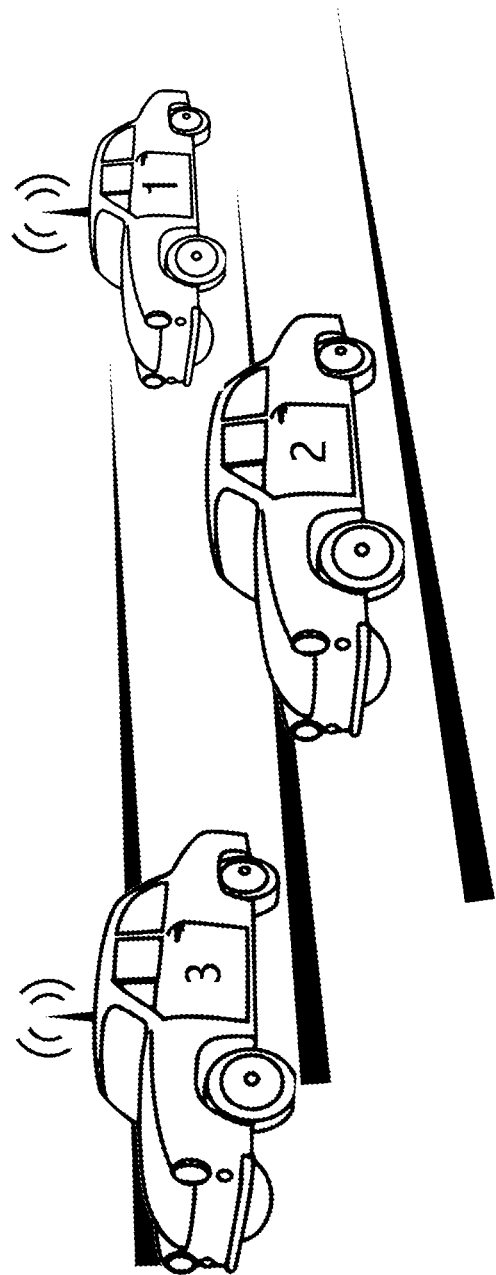
FIG. 4 shows three exemplary vehicles in two traffic lanes, with vehicles 1 and 3 V2V transponder equipped, vehicle 2 unequipped and being proxied.

FIG. 4 shows three vehicles. Vehicle 1 and 3 are equipped with a V2V transponder. Vehicle 2 is not equipped. It is being proxied by either vehicle 1 or vehicle 3. Proxying is important because, initially, many more vehicles will be proxied than are equipped. Proxying allows lane maps to be constructed far faster with early deployment of the V2V system, even when only a small fraction of vehicles are equipped.

FIG. 5 shows location points and how they are collected and used to generate lane records in a lane record store. 70 shows a typical intersection, here, a four-way stop. The paths of individual vehicles are recorded. Six such paths are shown in this Figure: 71, 72, 73, 74, 75, and 76. Path 76 is turning right; the other paths are going straight. Paths 72, 73, 74 and 75 approach four different stop signs, and stop. Path 71 accelerates away from a stop. Such activities, when repeated similarly by a plurality of vehicles, indicate the lane and road as people actually drive it. Core to this embodiment is that lane records are built from actual recorded behavior of many different vehicles; they are not created by a single audit or map source, nor provided by any central, cloud or government authority. For example, independent of any stop sign locations or stop line markings (or no marking), the average behavior, and the range of variation of those behaviors, determines if a given vehicle is behaving appropriately or not. As vehicles repeatedly approach and stop (or slow) at stop line 77, the existence of stop sign 78 is deduced. The collection of points in path 76 shows the in-practice turn radius of that right turn. Aggregates of points from many different vehicles, as shown by the bracket 79, are averaged to produce a mean lane line, 80. The mean deviation may be used to deduce a usable lane width. Similarly, average speed and speed deviations are used to create a profile of acceptable behavior for the lane, which is recorded both in the lane record and in the road history record. The lane record provide, in essence, average and common usage, while the road history provides, in essence, worst-case history in the context of statistical averages.

Figure 6:
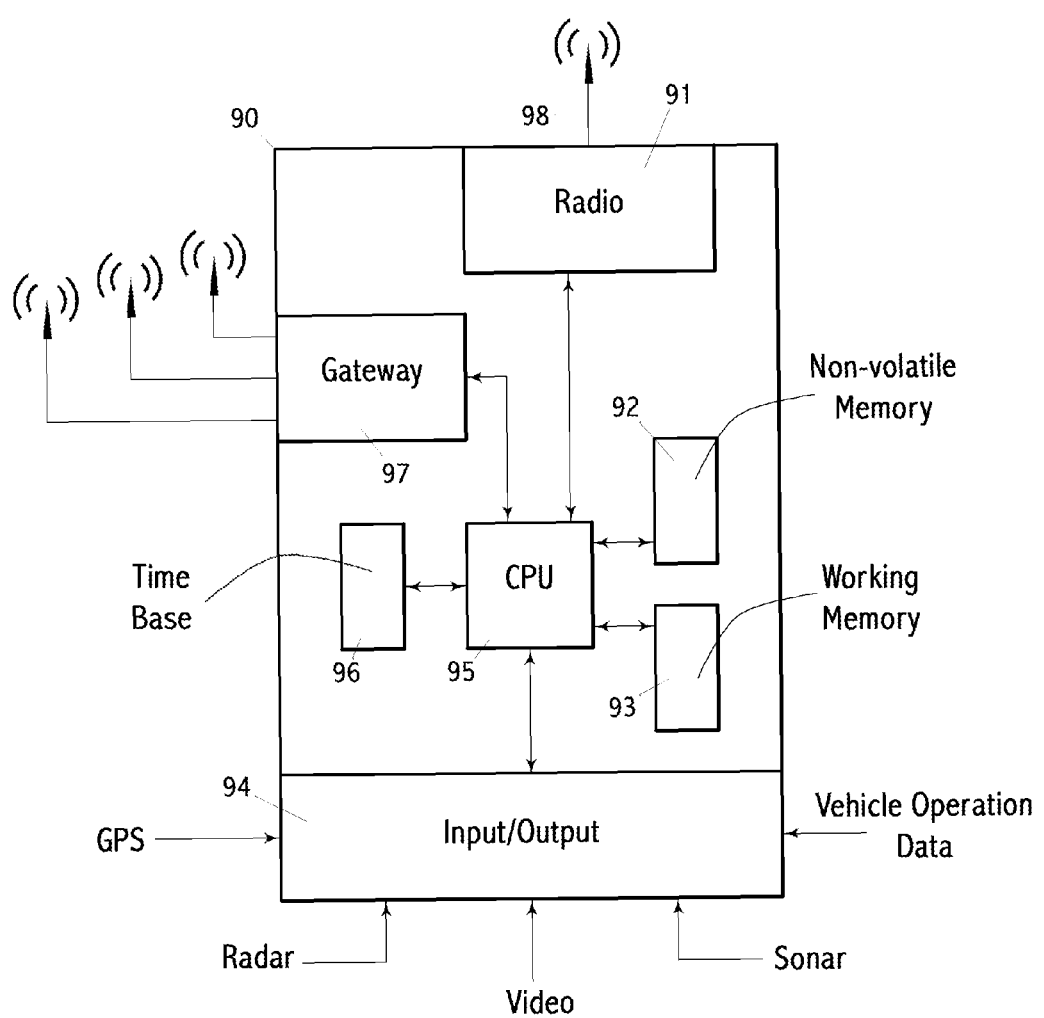
FIG. 6 shows an embodiment of a block diagram of a transponder.

FIG. 6 shows an embodiment of a block diagram of a V2V transponder, 90. 91 is the radio, which can send and receive in authorized V2V bands and modulations. 92 is non-volatile memory to hold lane records, road history, firmware, and the like. 93 is working memory, such as RAM. 95 is a CPU, processor, or a plurality of processors, include DSPs, for example. 96 is a time base, which may comprise a ovenized or temperature compensated crystal oscillator with an accuracy of 0.5 to 10 parts in $10^{13}$ per day, and accepts GPS or other satellite time as an input. 94 shows many input output capabilities, such as vehicle operation data (such as speed, heading, state of controls, braking, lights, etc.), sonar, radar and video for determining the relative position, heading and speed of nearby vehicles for location and elevation consensus, video or still image input for security and road documentation, and GPS or another satellite system for course location and timing. This list is not exhaustive. A gateway, 97, may provide connectivity to other networks, such as WiFi, cellular phone and cellular data, Bluetooth, and the like. 98 is the V2V radio antenna.

The essence of the V2V safety system is the regular broadcast, by all equipped vehicles of a vehicle "core data" time-critical, V2V safety message, comprising a vehicle's position, heading and speed, in a self-selected time slot in a repeating, fixed-time frame, or "basic time interval." The frame may be from 1 ms to 5000 ms; 100 ms is preferred. The number of time slots in a frame may be 10 to 10,000; 1000 time slots are preferred. Various wireless frequencies are possible, with government allocated frequencies for vehicle safety communications are preferred, such as are listed in IEEE 802.11p. Various modulations are possible, but the modulations as described in IEEE 802.11p are preferred.

The CSMA protocols of IEEE 802.11 are not effective for V2V safety applications. Thus, embodiments use a TDMA protocol, instead, with the TDMA frame divided into two or more class regions, as described above, with or without buffer regions between the class regions. One class region, the non-priority class region, uses a modified CSMA protocol to permit longer and non-time-critical messages, as compared to the priority and emergency class regions.

Fixed equipment, such as road-side unit (RSU) to vehicle communication is sometimes called X2V, or V2X. We use V2V to encompass all variations, including X2V, V2X, and defining cars, trucks, busses, trains, pedestrians, animals, moving sports equipment, construction equipment, fixed or temporary road hazards, government transponders, robots, automated vehicles and drones as "vehicles."

Collision prevention also includes collision mitigation and behavior modification that improves safety and safety margins, whether the vehicle behavior modification is automatic or human mediated.

A vehicle is "equipped" when it comprises a properly operating transponder sending valid V2V safety messages regarding a vehicle. An equipped vehicle may "proxy" for another, non-equipped vehicle, by sending data for the non-equipped vehicle on its behalf. In most case, "the vehicle" is either the equipped vehicle in which the transponder is located, or the non-equipped vehicle being proxied. Ideally, a single bit in the core safety message identifies if the message is a proxy message. A transponder may function as multiple transponders; for example, it may be sending messages for its host vehicles and two other, proxied vehicles; in this case, it acts as three separate transponders.

A transponder needs to know a vehicle's position, heading and speed. Typically, a mix of a global positing satellite receiver (such as GPS, or another system) and inertial navigation are used, often with other sensors or other data, to determine the "believed," "best computed" or baseline geographical position, heading, and speed. An electronic compass, magnetometer, accelerometer, motion sensor, or video inputs may be used. The actual transmitted position is compressed data, ideally an offset from a predetermined geographical grid. In addition, the transmitted position may be modified from the baseline position by a vector offset as part of "location consensus algorithm."

In one embodiment, a priority class region starts at frame 1 and grows upward based on demand; there may be a minimum size in the range of 10 to 500 time slots, such as 100 time slots. An emergency class regions starts at frame 1000 and grown downward based on demand; there may be a minimum size in the range of 10 to 100 time slots, such as 25 time slots. The emergency class region may be reserved for emergency vehicles, government authorized road-side equipment (RSU), or both. The priority class region is reserved for time-critical V2V safety messages; transponders should ideally self-select a single time slot in this class region and transmit a message in that time slot in every frame until a new time slot selection condition is met. However, a transponder occasionally not transmitting in a frame, or occasionally transmitting in a second time slot is still within the scope of claimed embodiments. Transponders should transmit in their selected time slot every frame, or at least in 50% of all frames.

The priority class region may be defined from time slot S1 to time slot S2. For example, S1 may be 1 and S2 may be 100. The non-priority class region may be defined from S3 to S4. For example, S3 may be 126 and S4 is 900. The class regions should not overlap, noting that short term, small overlaps have a negligible effect on the overall effectiveness of the V2V safety system of this invention and are considered within the claimed embodiments. The emergency class region may be defined from S5 to S6. For example, S5 may be 976 and S6 may be 1000. In these examples there is a 25 time slot buffer (101-125) and a 75 time slot buffer (901-975).

Core data messages (position, heading and speed), message collision messages, network error or hacking detection notification, and risk warnings above a risk threshold are all time-critical V2V safety messages. Generally, a transponder will send core message data in every frame. It will supplement this core message data with additional data, either time-critical or not time critical, as the need to send those messages arises. It may, for a period of one frame at a time, substitute a non-core-data message for a core data message, using the same time slot. Thus, up to every other frame may be non-core-data messages.

Additional data, beyond the core data, may be transmitted in the time window of one time frame by increasing the modulation complexity. Modulation may be selected on a per-message basis. Thus, it may change every time slot, every frame, or from one class regions to another.

In one embodiment the size of the priority class region resets at the end of each frame such that the number of empty time slots is a constant, such as 100, subject to a first limitation that a currently used time slot in class region, for example, time slot 163, restricts downsizing the class region to exclude the used time slot, and a second limitation that the priority class region may not grow into the emergency class region.

Similarly the emergency class region size resets at the end of each frame such that the number of empty time slots is a constant, such as 25, and the class region may not downsize such that it excludes a currently used time slot in the region. The emergency class region may expand to every time slot in the frame, if necessary.

The non-priority class region, which is managed with a modified CSMA protocol, consists of the "left over" times slots in the frame not in the priority or emergency class regions, or in any buffer zones. This class region supports a wide range of message times, message lengths, priorities, and modulations. It may have a different range, power, and inter-transmission guard time than the other class regions. Transmissions in this class region may not overlap with the priority and emergency class regions. They may overlap with a buffer zone for no more than one frame, and may not overlap with a buffer zone during the first transmission of a chained, or multi-part transmission. Differing priorities within this class region should use different parameters, such as different waiting times and different back-off periods. A multi-part transmission should start at the same time slot in each frame, even if the initial transmit time was selected using CSMA. A transponder may not begin transmitting in the non-priority class region until it first determines that all time slots that will be used by the transmission are empty in the immediately prior (or n immediately prior) frames. All transmissions in the non-priority class region ideally begin on time-slot boundaries, although they may end on a non-boundary, based on the length of the message.

An embodiment of a transponder continues to transmit in its selected time slot until either (a) it receives a transmit collision message involving itself, or (b) a time slot holding timer expires and the current time slot number is not in "no-reselection" range. Time slot holding timers may be 1, 2, 5, 10, 15, 30, 60, 90, 120, 180, 240, 300, or 600 seconds. No-reselection ranges may be 10, 20, 25, 50, 75, 100, 125, 150, 200, 250, 500 or 750 time slots. A preferred embodiment uses 90 second reselection timer and 100 time slot no-reselection range (slots 1-100) for the priority class region and 25 time slot no-selection range (slots 976-1000) for the emergency class region.

The size of the priority class and the emergency class regions should be adjusted after the end of every frame. They may be adjusted less often. If the priority class region begins at time slot S1 and ends at time slot S2, it consists of S2−S1+1 time slots. Some of these time slots are empty, as defined above. The remaining time slots are non-empty. A time slot "in use" means that that in the immediately prior (or in one of the n immediately prior) frames, a valid message was received in that time slot. A time slot may be non-empty but not in use; for example, it may contain noise. An available time slot has to be empty and otherwise be suitable for selection as a time slot by a transponder. Some time slots may be reserved, or otherwise not available. For example, time slot 1 or 1000 may be reserved (to permit much long transmission distances for time slot 1000 or 999, for example).

Note that the range set for each vehicle may be different, as each vehicle is in a different location and has slightly different communications hardware. Thus, the computed size of the class regions may be different for every vehicle in a particular range set. However, the sizes will not differ by much; and, for vehicles close together, the computed sizes of the class regions will be close. This is one reason for the buffer zones. Also, this is why "non-empty" is used in setting the maximum time slot number of the priority class region, rather than "in use."

Equipped vehicles should send a V2V safety message in the priority class region in every frame, if the vehicle is operating. A parked vehicle may or may not be operating. An operating emergency vehicle may stop sending in the emergency class region if it is no longer operating in an emergency mode. An emergency vehicle may send emergency or non-emergency priority messages in the priority class region. An emergency vehicle may send any type of message in the non-priority region, including emergency messages.

When adjusting the sizes of the class regions, the emergency class region is resized first, then the priority class region, then the non-priority class region. Thus, the non-priority class region gets the "left over" time slots, excluding any times slots in buffer regions or reserved time slots. Reserved time slots may be considered as a buffer region.

A key embodiment is that operating transponders self-select and then repeatedly use one time slot in every frame. In general, low data rate modulation schemes, such as BPSK or QPSK have lower data rates but higher reliability for a given power level, distance or background noise. High data rate modulation schemes, such as 256 QAM have higher data rates at the cost of potentially lower reliability or lower range for a given power level. Since each message in the priority and emergency class regions is generally restricted to one time slot, different modulation schemes translate to different maximum message lengths. Transponders should select the modulation scheme with the highest reliability for the necessary message size. Transponders are permitted to send priority class messages in the non-priority class region.

A message may consist of a Type 0 message, or may consist of one or more of sub-messages. Each sub-message has a non-zero Type number. Table II below shows the size of Type 0 and some sample sub-messages.

TABLE II

Message Sizes in Bits

| Field Name | Size | Type 0 | Header | Type 1 | Type 2 | Type 3 | Null |
|---|---|---|---|---|---|---|---|
| V2V revision level | 4 | 4 | 4 | | | | |
| Flags | 4 | 4 | 4 | | | | |
| Message size | 8 | 0 | 8 | | | | |
| Sub-message type | 6 | 0 | | 6 | 6 | 6 | 6 |
| Final risk | 4 | 4 | | 0 | 4 | 4 | 0 |
| Vehicle type | 6 | 6 | | 0 | 6 | 6 | 0 |
| Collision type | 4 | 4 | | 0 | 4 | 4 | 0 |
| Risk sources | 4 | 4 | | 0 | 4 | 4 | 0 |
| Offset N-S | 24 | 24 | | 24 | 0 | 24 | 0 |
| Offset E-W | 24 | 24 | | 24 | 0 | 24 | 0 |
| Angle of travel | 10 | 10 | | 10 | 0 | 0 | 0 |
| Speed of travel | 10 | 10 | | 10z | 0 | 0 | 0 |
| Lane type | 8 | 8 | | 0 | 8 | 8 | 0 |
| Risk type | 12 | 12 | | 0 | 12 | 12 | 0 |
| Fill | | | | | | | 18 |
| Subtotal | 128 | 114 | 16 | 74 | 44 | 92 | 24 |

Field definitions follow. V2V revision level is a 4-bit field that defines the applicable level of features or Standards used by the transponder. A value of zero means that the message is a Type 0 message. The Flags field consists of four binary flags: emergency, final, forward, and proxy. The emergency flag is true if the message is transmitted by an emergency vehicle. The final flag is true if this message is the final frame of a "chained," or multi-part transmission, and true if the message is not a multi-part message. The forward flag is true if the message is a forwarded, rather than an original, message. The proxy flag is true of the message is a proxy message, meaning that vehicle described in the message is not the host vehicle for the transponder. The message size field is an 8 bit unsigned integer that is the number of 24-bit symbols in the message. The sub-message type is a 6-bit field identifying the type, and thus the length (which is fixed for each type of sub-message), of the sub-message. The final risk is a 4-bit field that contains the current computed risk value by the transponder. See the final risk table, elsewhere herein. The vehicle type is a 6-bit field that contains a vehicle type from a pre-determined vehicle type table. The collision type is a 4-bit value that contains a collision type from a pre-determined collision type table. The risk sources field is a 4-bit field comprising four flags to identify the primary reason or reasons for the final risk. These flags are: vehicle behavior, road and weather conditions, traffic, and location history. Vehicle behavior means that one or more vehicles are behaving in an unsafe say; road and weather conditions means that the road condition or weather conditions, such as an icy surface are unsafe; traffic means that the overall behavior of traffic is unsafe; location history means that the stored history of the current location is unsafe. The threshold of "safe" or "unsafe" for the four flags in this field depends, in part, on the final risk value. Offset N-S is a 24 bit signed integer that represents the number of cm on a N-S longitude line from the nearest or selected grid point. Offset E-W is a 24 bit signed integer that represents the number of cm on an E-W altitude line from the nearest or selected grid point. Note that the two Offset fields, as transmitted, may have additional offsets due to location consensus. The two Offset fields make up the vehicle position. They may be considered a vector from the nearest (or selected) pre-defined grid point to the reference location on the vehicle. This embodiment uses distance, which should be either straight line or on the surface of the earth at elevation of the vehicle. Other embodiments may use a unit in degrees, such a 0.1 seconds of arc. Angle of travel is a 10-bit field with an unsigned integer in the range of 0 to 1023, representing the 360° compass divided into 1024 equal headings, with true North being 0. The speed of travel field is an unsigned 10-bit integer that represents the forward speed of the subject vehicle in units of 0.1 m/s. (about 0.2 mph), with an offset of 10 m/s. Thus the range of this field is −10 m/s (field value of 0) to +92.3 m/s (field value of 1023). A stopped vehicle uses a field value of 100. Speeds in the range of −10 m/s to −0.1 m/s represent a vehicle backing up. For a vehicle backing up at a speed greater than 10 m/s, the vehicle should be "turned around," that is, the reference point should be moved to the center of the back of the vehicle and the speed now encoded as positive. This field has an approximate range of −22 mph to 206 mph.

Embodiments of a geographical grid for use in transmitting Offsets from a grid point include any predefined set of grid points; grid points spaced at 2°, 1°, 0.5°, 0.25°, 0.1°, 0.025° for latitude or longitude or both, or any interval in the range of 0.01° to 5°. Either or both the geographic grid and the transmitted offsets may be in units of latitude, longitude, or distance, or any combination. Elevation may also be based on elevation intervals while transmitting only an offset from a predetermined interval. Elevation intervals may be 10, 50, 100, 200, 500, 1000 meters, or any interval between 1 and 1000 meters or between 1 and 1000 feet. Generally, a transponder should use the nearest grid point; however, it should not change a grid point abruptly when another grid point becomes closer. A transponder may change grid points when a majority of vehicles in its range set are using a different grid point. A transponder must determined which grid point, out of as many as four possible grid points, is being used for each received message with a position. Only one such grid point will generate a rational (near by) position.

The PLCC preamble, FCS, SIGNAL, and other parts and aspects of the transmission, including modulations, but excluding MAC and IP addresses, higher level protocol data, minimum message size and CSMA parameters, are defined by IEEE 802.11p.

A Type 0 message comprises core data, that is: vehicle position, heading and speed, in the fields Offset N-S, Offset E-W, Angle of travel, and speed of travel, as described above. A Type 0 message does not contain any sub-messages and does not contain a message size field. As can be seen from the above Table, this basic, short message contains a substantial amount of data relevant to prevent or mitigate vehicle collisions. If core data is combined with other sub-messages, a Type 1 sub-message may be used.

Messages containing sub-messages contain a Header, shown in the above table. The Header contains a Message size field, which indicates the number of 24-bit symbols in the message. Since each sub-message Type has is fixed length, it is easy to tell if a sub-message is the last sub-message, or if another sub-message follows. Following the Header are one or more sub-messages. Each sub-message begins with a 6-bit Sub-message type field. The Table above shows the fields used in four types of sub-messages: Type 1, Type 2, Type 3, and Null type. Type 1 sub-messages comprise core vehicle data of: vehicle location, heading and speed. Type 2 sub-messages contain risk and vehicle type fields. Note that Type 1 and Type 2 sub-messages, together, have essentially the same information as a Type 0 message. Type 3 sub-message are used to communicate a location of a risk that is not the location of the vehicle that is otherwise the subject of message of this transponder (such as the host vehicle or a vehicle being proxied). It comprises a location, but no heading or speed. For example, it might be the point of expected impact, or a location of an icy patch on a road. The other fields in the Type 3 message provide more information about the nature of the specific risk at the included location in the sub-message. A Null Type is used for padding, if necessary. There are many other sub-messages types, some of which are discussed elsewhere, herein.

The reference point for the location of a vehicle is the intersection of the center-line of the vehicle and the perpendicular line that comprises the forward most point on the vehicle. The elevation of the reference point is the road surface.

Novel features of an embodiment include broadcasting some or all of the fields and flags described above for a Type 0 message in a regular TDMA V2V message, such as in at least 50% of all frames.

TABLE III

| Lane Types and Lane Type Values Lane Type | |
|---|---|
| Lane information not in message | 0 |
| Indeterminate - not intersection | 1 |
| Indeterminate - intersection | 2 |
| Intersection - shared | 3 |
| Intersection - reserved | 4 |
| Turning right at intersection | 5 |
| Turing left at intersection | 6 |
| changing lanes leftward | 7 |
| changing lanes rightward | 8 |
| merging lanes leftward | 9 |
| merging lanes rightward | 10 |
| Lane 1 | 11 |
| Lane 2 | 12 |
| Lane 3 | 13 |
| Lane 4 | 14 |
| Lane 5 | 15 |
| Lane 6 | 16 |
| Lane 7 | 17 |
| Left shoulder | 18 |
| Right shoulder | 19 |
| Center shared left-turn lane | 20 |
| Left-side off-road | 20 |
| Left-side off-road | 21 |
| Right-side off-road | 22 |
| Merging lane on left | 23 |
| Merging lane on right | 24 |
| Right lane must exit | 25 |
| Left lane must exit | 26 |
| Shared merge on-off lane | 27 |
| Short merge | 28 |
| Lane or road classification change | 29 |

TABLE III-continued

| Lane Types and Lane Type Values Lane Type | |
|---|---|
| Left-turn lane 1 | 30 |
| Left-turn lane 2 | 31 |
| Left-turn lane 3 | 32 |
| Right turn lane (farthest right) | 33 |
| Right-turn lane (2nd from right) | 34 |
| Right-turn lane (3rd from right) | 35 |
| Traffic lanes with no lane marks | 36 |
| Shared bicycle lane straight ahead | 37 |
| Shared bicycle lane left | 38 |
| Shared bicycle lane right | 39 |
| Clover-leaf section | 40 |
| Traffic circle | 41 |
| Traffic circle - entering | 42 |
| Traffic circle - leaving | 43 |
| Two-way driveway, right side | 44 |
| Two-way driveway, left side | 45 |
| One-lane driveway, proper direction | 46 |
| One-lane driveway, improper direction | 47 |
| Unpaved, unmarked | 48 |
| Construction detour | 49 |
| Accident detour | 50 |
| Contradictory lane information | 51 |
| One-way lane, two-way traffic | 52 |
| Bridge lane | 53 |
| Cul-de-sac | 54 |
| HOV | 55 |
| HOV+ | 56 |
| Bicycle parking | 57 |
| Crosswalk | 58 |
| Sidewalk | 59 |
| Single parallel parking space | 60 |
| Single diagonal parking space | 61 |
| Parking on non-standard side | 62 |
| Parking lot, set spaces | 63 |
| Parking lot, open parking | 64 |
| Oversize vehicle parking space | 65 |
| Valet parking pickup/drop-off space | 66 |
| Red parking zone | 67 |
| Yellow parking zone | 68 |
| Green parking zone | 69 |
| White parking zone | 70 |
| Ferry or elevator parking space | 71 |
| Farm or construction equip parking | 72 |
| Handicap parking space | 73 |
| Private garage | 74 |
| Motorcycle parking | 75 |
| Off-road bicycle path | 76 |
| Off-road pedestrian path (paved) | 77 |
| Off-road pedestrian path (unpaved) | 78 |
| Off-road animal path | 79 |
| reserved | 80-254 |
| unknown | 255 |

TABLE IV

| Vehicle Type and Value Vehicle Type | |
|---|---|
| no vehicle type in message | 0 |
| private car, pickup or van | 1 |
| limousine, long or stretch | 2 |
| commercial car, pickup or van | 3 |
| medium size commercial truck | 4 |
| stopped medium delivery vehicle | 5 |
| semi tractor only | 6 |
| semi, one trailer | 7 |
| semi, two trailers | 8 |
| short bus | 9 |
| full-size bus or RV | 10 |
| emergency vehicle, up to medium | 11 |
| emergency vehicle, large | 12 |
| farm vehicle | 13 |
| oversize vehicle | 14 |
| roadside fixed equipment | 15 |

TABLE IV-continued

Vehicle Type and Value

| Vehicle Type | |
|---|---|
| roadside fixed obstruction | 16 |
| in roadway debris | 17 |
| accident | 18 |
| roadside construction equipment | 19 |
| bicyclist | 20 |
| pedestrian, upright | 21 |
| pedestrian, high speed | 22 |
| handicapped person, e.g. wheelchair | 23 |
| person down on roadway | 24 |
| crowd on roadway | 25 |
| event on roadway (e.g. crafts fair) | 26 |
| domestic animal e.g. guide dog | 27 |
| non-domestic animal, e.g. livestock | 28 |
| other tiny (size TBD) | 29 |
| other small (size TBD) | 30 |
| other medium (size TBD) | 31 |
| other large (size TBD) | 32 |
| other oversize (size TBD) | 33 |
| reserved | 34-62 |
| unknown vehicle type | 63 |

Table I—Lane Types and Lane Type Values, above, shows one embodiment how different traffic lanes, and pedestrian and sports areas, are coded in a V2V message field of 8-bits. Lane type is very useful to use with traffic signal timing, as the phases are frequently related to lane type. For example, left turns and through lanes may have different phases. Lane type and lane maps are critical for an effective V2V system. Some embodiments generate their own lane maps and make their own lane type determinations. Thus, some embodiments are fully independent of any government or central authority to generate, provide, maintain and protect such information. Embodiments that generate their own lane maps and lane type determinations generally use vehicle behavior to for these purposes, although vision based and other sources if information may also be used. Embodiments share this data via lane map requests and lane map transmissions. The physical location of lanes may be encoded using endpoints, waypoints, corner points, Bezier curves, elevation angles, and other methods known in the art. Fields are ideally offsets from a predetermined set of grid points. Compression may be used. Cubic Bezier curves are recommended.

Table IV—Vehicle Type and Value, above, shows an embodiment of coding a vehicle type into V2V messages, including core data Type 0 messages. A 6-bit field is used. The purpose of this field is not to include all possible vehicle types, but rather to provide critical information that is needed to make a reasonable safety or collision avoidance or mitigation response. There is a critical difference in being about to be hit from the side by a semi or are about to run over a pedestrian down on the road. Thus, size, weight and fundamental category (truck, pedestrian, animal, etc.) are the primary differentiators of different vehicle types in this field.

The meaning of the term "message" includes "sub-message." A "consensus group" is a group of transponders participating in a convergent algorithm using the V2V messages of embodiments of this invention.

Suitable buffer zone sizes may be 10, 20, 50, 100, 125, 150, 200, 250, or 300 time slots. Suitable buffer zone sizes are 10%, 15%, 20%, 40%, 50%, 75%, 100%, or 200% of a current priority or emergency class region size. Buffer zone sizes may be a combination of a numerical time slot count and a percentage of an class region size, such as the larger of 50 time slots or 50% of current class region size, subject the limit of all time slots. Buffer zone size may be fixed or variable.

Embodiments and possible limitations include: A minimum number of time slots of 50, 100, 150, 200, 250, 500, 1000, 2000; A minimum number of time slots for vehicle safety messages comprising (i) vehicle position, (ii) vehicle speed, and (iii) vehicle heading are 15, 50, 100, 150, 200, 250, 500, 1000, or 2000; A minimum number of time slots for vehicle safety messages comprising (i) vehicle position, (ii) vehicle speed, (iii) vehicle heading, and (iv) vehicle identification suitable for V2V potential collision warnings are 15, 50, 100, 150, 200, 250, 500, 1000, or 2000; A minimum number of time slots for vehicle safety messages dedicated to being transmitted by a combination of emergency vehicles and government authorized road-side units are 10, 25, 50, 100, 150, 200, 250, or 500; A maximum time for the basic time interval is 2, 1, 0.5, 0.25, 0.1, 0.05, or 0.01 seconds; A minimum transmit rate for V2V safety messages or messages suitable for V2V potential collision warnings is 1, 2, 5, 7.5, 10, 15, or 20 times per second; A maximum message length for data, exclusive of: wireless header, preamble, signal field, frame check sum, and inter-transmission guard time is 114 bits, 282 bits, 36 bytes, 50 bytes, 75 bytes, 100 bytes, 150 bytes, 200 bytes, 250 bytes; A maximum message length for data, exclusive of: wireless header, preamble, signal field, frame check sum, and inter-transmission guard time but inclusive of any MAC or IPS address, if any, is 114 bits, 282 bits, 36 bytes, 50 bytes, 75 bytes, 100 bytes, 150 bytes, 200 bytes, 250 bytes; A maximum time of an inter-transmission guard time of 1, 2, 3, 4, 5, 7.5 10, 15, 20, 25, 50 microseconds; An inter-transmission guard time computed by maximum intended range of single-hop V2V communications divided by the speed of light, plus two times the allowable common time base error; A maximum intended range of single-hop V2V communications of 50, 100, 250, 500, 750, 1000, 1500, 2000, 2500, 5000, or 10000 meters; A minimum number of vehicles that may simultaneously use a V2V communications system with 90%, 95%, 99%, 99.5%, 99.9% or 99.99% reliability is 10, 25, 50, 75, 100, 150, 200, 250, 350, 500, 750, or 1000; A minimum number of time slots reserved for land vehicle use; A transponder, for each subject vehicle, transmits a vehicle safety message or a V2V message suitable for collision prevention no more than once per basic time interval, in at least 90% of all basic time intervals; Each non-forwarded safety message comprising a subject vehicle position is unique for the basic time interval in which it is broadcast; Each safety message is updated for each basic time interval in which it is broadcast; Each safety message comprises data that is to be interpreted as valid precisely at the end of the basic time interval in which it is broadcast; V2V system incorporating transponders of this invention are free of roadside units (RSU's); V2V system incorporating transponders of this invention are free of the necessity for any fixed infrastructure, such as servers, cell towers, or RSUs; All time slots are available for use by mobile transponders. Such limitations or features of this paragraph may be in any combination. A preferred embodiment is a basic time interval of 0.1 seconds comprising 1000 time slots with an intended range of 1000 meters comprising V2V safety messages of 114 data bits and 282 data bits, supporting a minimum number of time slots reserved for a combination of emergency vehicle and government provided RSU use.

A functioning V2V system requires at least two transponders. Because of proxying, such a V2V system using the transponders of these embodiments is effective with as little as 10% penetration. Penetration is the percent of vehicles in a defined region or class that are equipped. A "subject vehicle" is the vehicle whose data is in a message. The "host vehicle"

is the vehicle in which the transponder is located. Proxying is when the subject vehicle is not the host vehicle.

The embodiments and scenarios are described herein are non-limiting. As those trained in the art appreciate, there are many alternative and equivalent embodiments of this invention. Small variations from absolutes, constants, and limits, such as "all," "always," or "one," that have a minimal effect on the purpose of the invention, are within the scope of the claims. A "minimal effect" may be defined as one that reduces the desired effectiveness by 5% or less.

Applications to which this application claims priority are incorporated herein. The terms "position" and "location" may be used interchangeably. Embodiments of this invention include all possible combinations of all limitations, options, features, and ranges disclosed herein, including in the claims and drawings.

What is claimed is:

1. A vehicle-to-vehicle (V2V) communication transponder adapted to operate in a first vehicle wherein the transponder is adapted to accept as input a first location of the first vehicle and a vehicle heading of the first vehicle, and wherein the transponder is adapted to broadcast a series of V2V safety messages wherein a majority of V2V safety messages comprise: (i) the first vehicle position; (ii) the first vehicle heading; and (iii) a first vehicle speed; and wherein the transponder comprises a lane map data store in non-transitory memory; wherein the improvement is:

the lane map data store further comprises: (i) a location point store comprising one or more location points, and (ii) a lane records store;

wherein the location point store comprises a plurality of locations contained in V2V safety messages received by or transmitted by the V2V communication transponder;

wherein the lane records store comprises one or more lane records and wherein each lane record comprises: (i) a lane type, and (ii) location data that identifies the location of the lane.

2. The vehicle-to-vehicle (V2V) communication transponder of claim 1 wherein:

the V2V communication transponder is further adapted to broadcast one or more lane records in response to a valid lane record request received from another transponder.

3. The vehicle-to-vehicle (V2V) communication transponder of claim 1 wherein:

at least a portion of the lane records, "internally generated lane records," are computed from a plurality of location points in the location point store.

4. The vehicle-to-vehicle (V2V) communication transponder of claim 3 wherein:

each lane record further comprises: (iii) an "internal source count" wherein the internal source count is incremented for an each "unique vehicle" that provides one or more points in the location point store for points that are in the lane identified by the location data in the lane record;

wherein a unique vehicle means a vehicle in communication with the first vehicle during a time period when either the unique vehicle or the first vehicle are continuously within at least a portion of the lane identified by the location data in the lane record; and wherein a unique vehicle includes the first vehicle for each separate time the first vehicle is continuously within at least a portion of the lane identified by the location data in the lane record.

5. The vehicle-to-vehicle (V2V) communication transponder of claim 4 wherein:

each lane record further comprises: (iv) a "shared source count";

wherein the transponder is adapted to transmit the internal source count and the shared source count of a first lane record;

wherein the transponder is adapted to receive from a second transponder a "received internal source count" and a "received shared source count" of the first lane record;

wherein the new shared source count is the maximum of: (i) the old shared source count, (ii) the internal source count plus the received internal source count, and (iii) the received shared source count.

6. The vehicle-to-vehicle (V2V) communication transponder of claim 5 wherein:

the new shared source count is updated when the first vehicle passes within communication range of the at least some part of the lane of the first lane record.

7. The vehicle-to-vehicle (V2V) communication transponder of claim 5 wherein:

the V2V communication transponder will not broadcast a first lane record in response to a lane record request from a requesting vehicle if the transponder determines that the transponder has previously broadcast the first lane record in response to a request from the requesting vehicle, unless the internal source count or the shared source count for the first lane record has increased more than a predetermined threshold than the respective source count was at the time of the prior broadcast.

8. The vehicle-to-vehicle (V2V) communication transponder of claim 5 wherein:

the V2V communication transponder will not broadcast a first lane record in response to a lane record request from a requesting vehicle if the transponder receives a broadcast of a second lane record describing the same lane as the first lane record and the internal source count or the shared source count of the second lane record is more than or equal to the internal source count or the shared source count, respectively, of the first lane record, minus a predetermined count offset, and the transponder determines that the requesting vehicle is in communication range of the broadcast of the second lane record.

9. The vehicle-to-vehicle (V2V) communication transponder of claim 5 wherein:

the V2V communication transponder is adapted to broadcast a lane record request for at least one lane and wherein the lane record request comprises a minimum internal source count for all lanes in the request; and wherein the lane record request comprises a minimum shared source count for all lanes in the request.

10. The vehicle-to-vehicle (V2V) communication transponder of claim 9 wherein:

the V2V communication transponder will not broadcast a first lane record in response to a lane record request from a requesting transponder if the minimum internal source count in the lane record request is equal to greater than or the internal source count in the first lane record, and the minimum shared source count in the first lane record request is equal to or greater than the shared source count in the first lane record.

11. The vehicle-to-vehicle (V2V) communication transponder of claim 5 wherein:

when a "lane incompatibility condition" occurs for a lane of a first lane record, the transponder marks the first lane record as "changed," and sets the internal lane source count and the shared lane source count of the first lane record to zero, and broadcasts a "lane status change" message.

12. The vehicle-to-vehicle (V2V) communication transponder of claim 11 wherein:

the "lane incompatibility condition" comprises any of: (i) behavior of a predetermined minimum number of vehicles that is incompatible with the lane type, (ii) behavior of a predetermined minimum number of vehicles that is inconsistent with historical behavior at the locations of the behavior, or (iii) receipt of a second lane record that is incompatible with the first lane record.

13. The vehicle-to-vehicle (V2V) communication transponder of claim 1 wherein:
  each lane record further comprises: (v) a lane confidence number; and
  wherein the lane confidence number is computed responsive to a number of applicable location points in the location point store wherein the applicable location points comprise location points in the lane described by the location data for the each lane record, within a predetermined location point accuracy threshold.

14. A vehicle-to-vehicle (V2V) communication system using a plurality of vehicles each equipped with a transponder of claim 1.

15. A vehicle equipped with a transponder of claim 1 wherein the subject vehicle is the equipped vehicle.

* * * * *